(12) United States Patent
Wagner

(10) Patent No.: US 7,776,148 B2
(45) Date of Patent: Aug. 17, 2010

(54) HARDENABLE MIXTURE BASED ON PRODUCTS OF HYDROLYSIS OF ORGANOSILANES AND BLOCKED POLYISOCYANATES

(75) Inventor: Georg Wagner, Marpingen (DE)

(73) Assignee: NTC Nano Tech Coatings GmbH, Tholey (DE)

( * ) Notice: Subject to any disclaimer, the term of this patent is extended or adjusted under 35 U.S.C. 154(b) by 1 day.

(21) Appl. No.: 10/451,737

(22) PCT Filed: Oct. 19, 2002

(86) PCT No.: PCT/DE02/03953

§ 371 (c)(1),
(2), (4) Date: Dec. 22, 2003

(87) PCT Pub. No.: WO03/037947

PCT Pub. Date: May 8, 2003

(65) Prior Publication Data

US 2004/0097641 A1     May 20, 2004

(30) Foreign Application Priority Data

Oct. 25, 2001   (DE) ................................ 101 52 853

(51) Int. Cl.
   *C09D 183/06*   (2006.01)
(52) U.S. Cl. ............................. 106/287.13; 106/287.16; 106/287.17; 106/287.18; 106/287.19; 106/287.22; 528/25; 528/28
(58) Field of Classification Search ............. 528/25–29, 528/45; 106/287.13, 287.16; 428/447
See application file for complete search history.

(56) References Cited

U.S. PATENT DOCUMENTS

| 4,444,973 | A | * | 4/1984 | Schonfelder et al. | ........... 528/28 |
| 4,732,787 | A | * | 3/1988 | Vantillard et al. | ............ 427/386 |
| 4,745,028 | A | * | 5/1988 | Das et al. | ..................... 428/391 |
| 4,847,319 | A | * | 7/1989 | Bandlish | ..................... 524/589 |

FOREIGN PATENT DOCUMENTS

| DE | 44 10117 | 10/1994 |
| DE | 199 09894 | 9/2000 |
| EP | 074 010 | 3/1983 |
| EP | 997 446 | 5/2000 |

* cited by examiner

*Primary Examiner*—Marc S Zimmer
(74) *Attorney, Agent, or Firm*—Novak Druce + Quigg LLP

(57) ABSTRACT

Curable compositions with at least one hydrolyzis products from an organosilane of a general formula $R^1_a R^2_b SiX_{(4-a-b)}$, or oligomer therefrom, wherein $R^1$ represents a non-hydrolyzable radical, $R^2$ represents a non-hydrolyzable radical that includes a functional group and X represents similar or different radicals that are hydroxyl-groups and hydrolyzable products of substitution reactions of hydroxyl groups and wherein a is 0 or 1, b is 0 to 3 and the sum of a and b can be 1, 2 or 3, and at least one substituent $R^2$ is an epoxy group and at least one blocked polyisocyanate. The invention also includes mixtures which contain pigments and/or fillers, the process for the production of crosslinked masses through reaction of the hydrolyzis products, namely modified polysiloxanes, with blocked polyisocyanates as well as therewith produced coatings and molded bodies.

15 Claims, No Drawings

HARDENABLE MIXTURE BASED ON PRODUCTS OF HYDROLYSIS OF ORGANOSILANES AND BLOCKED POLYISOCYANATES

Coatings based on organically modified crosslinked polysiloxanes are known. They show valuable physical and chemical properties and they bond firmly to different surfaces (metals like Steel, Brass, Aluminum, Magnesium; Ceramic; Polymers; Glass). They are mechanically and chemically resistant, for example against wear and the most chemicals.

These coatings are synthesized via the so called sol-gel process from organosilanes (alkoxysilanes), optional together with metal-alkoxides such as, e. g., aluminumpropylate or -butylate through hydrolyzation, whereby. aqueous sots of predominantly oligomeric, temporarily stable condensable organosilanols are obtained, that finally pass into gels by loss of water.

For the synthesis, e.g. organosilanes of a general formula $$R^1_a R^2_b SiX_{(4-a-b)}$$

are hydrolyzed to silanoles, wherein $R^1$ represents a non-hydrolyzable radical, $R^2$ represents a non-hydrolyzable radical that includes a functional group and X represents similar or different radicals that are hydroxyl-groups and hydrolyzable products of substitution reactions of hydroxyl groups, wherein a and b can be independent from each other numbers of 0 to 3 and the sum of a and b can be 1, 2 or 3. The said water-containing or when alkoxysilanes were used, water-alcohol solutions can be time stored and can be polycondensed by building a gel.

When the gels are applied onto substrates and heat cured they develop exceptionally strong bonds. Therefore, they were, hitherto, used as coatings for the improvement of scratch resistance of optical glass. A description of the sol-gel process that can serve as an introduction according to the present invention may be found in DE-A1-43 38 360. Some variations of the process and of these compounds are described in WO 95/13326 and WO 97/20005, which form a background for further explanation of the invention hereinafter described.

The previous applications were, due to the relatively high prices for alkoxysilanes, generally limited on protective coatings for sensitive surfaces like optical lenses that are made of organic polymers, that subsequently had to made more scratch and otherwise resistant than these polymers are per se. But there is a need for coatings and the necessary coating materials that, one the one side, show the advantages of condensed organosilanes and, on the other side, are more economical.

The viscous liquids containing hydrolyzed silanes have already been combined with additives that are capable to condense (e.g., bisphenoles) and link to the established network structure. Also the modified mixtures can be used as coating materials which can be processed the same way as the non-modified organosilanoles which means that they were applied to a substrate and transformed into a gel and thermally cured.

It is known that silicon containing monomers can be modified. A well known class of silicon containing monomers are silanes or silanoles having an epoxide ring. These monomers and their use are described for example in German Offenlegungsschrift 197 37 475.

It is furthermore known that (European Coatings Conference, Zurich, 03./04. 2001, p. 163 ff.) silanoles can be reacted with blocked polyisocyanates. The silanes that have been used to produce the silanoles are not modified with epoxy-groups. The curing process requires a catalyst of the type of harmful organic tin compounds (DBTL=dibutyltin dilaurate) that have to been added to achieve a satisfactory curing time.

It is a subject of the present invention to provide, with economic means, an organically modified system on the basis of polysiloxanes that were modified with epoxy groups, suitable for the synthesis of coatings that show a hardness significantly higher than that of the materials described in the prior state of the art and which do not need any catalysts for curing. It is a special task of the invention to create a mixture that must not be mixed from two components before the application but can be used as a single component system. Furthermore, said system should also allow the preparation of stable intermediates which may be applied onto substrates and show properties constant with time as well as the adjustment of variable surface-physical and surface-chemical properties such as hydrophilicity or hydrophobicity in combination with oleophobicity.

It was found that certain blocked polyisocyanates can be used as a modifying agents for gels and their precursors that are capable to condense. According to the present invention, particularly silanoles that are modified with epoxy groups were reacted with blocked isocyanates. The used epoxysilanes and the products of their hydrolysis that can be condensed and the blocked polyisocyanates are known compounds, as will be described in the following.

Subject of the present invention is a curable mixture as well as a process based on this mixture for the processing of crosslinked polymeric materials based on polysiloxanes achieved from hydrolyzis of organosilanes with at least one radical that can not be hydrolyzed and that is directly connected to the silicon atom as a substituent and that exhibits at least two radicals, directly attached to the silicon atom that can be reacted to silanole functions where the used silanes have a non-hydrolyzable radical having an epoxide ring and the products of the hydrolyzation were reacted with at least one blocked polyisocyanate.

According to the present invention, particularly the curable mixtures contain:

A. a reaction product of the hydrolyzis of an organosilane of a general formula (A)

$$R^1_a R^2_b SiX_{(4-a-b)} \qquad (A)$$

wherein $R^1$ represents a non-hydrolyzable radical, $R^2$ represents a non-hydrolyzable radical that includes a functional group and X represents similar or different radicals that are hydroxyl-groups and hydrolyzable products of substitution reactions of hydroxyl groups, or oligomers therefrom, wherein a is 0 or 1,
b is 0 to 3 and
the sum of a and b can be 1, 2 or 3,
and at least one substituent $R^2$ has an epoxy group;
B. at least one blocked polyisocyanate B.

Furthermore, the subject of the present invention is a curable mixture, that contains a product of a hydrolyzation reaction, that was obtained through common hydrolyzes of at least one organosilane of the general formula A with optional use of not more than 50% per weight referred to A:

at least one silane of the general formula $SiX_4$, wherein the radical X is defined as in the case of general formula (A);
at least one silane wherein the radical has no epoxide ring;
at least one hydrolyzed alkoxide of an earth metal or a chemically related metal;
at least one aromatic or aliphatic diol:

at least one silane of the general formula $SiX_4$, wherein the radical X is defined as in the case of general formula (A) and/or further hydrolyzable chemical compounds, provided that the sum of all optional added compounds is not more than 50% based on the solid content of A.

The invention also comprises the coatings and molded bodies obtained from these mixtures.

For the production of organosilanes of the general formula (A) or their mixtures or oligomers therefrom, optional together with up to 50% per wt. of different compounds from above were hydrolyzed to silanoles. The silanoles exist as an object of the present invention at least partly as oligomers. According to the present invention the soles are mixed with one or more of the blocked isocyanates and may be stored in this form. The mixtures are transformed to a gel with increased temperatures and thus irreversibly reticulated.

To understand the invention the following is to say: In sol-gel processing the direct use of free, unblocked polyisocyanates is not possible because of the existing water, leading to an early reaction with water by a part of the isocyanate groups leading to a fast gelation and therefore would be unusable. According to the present invention this difficulty can be avoided by using blocked polyisocyanates. They are stable against water at room temperature and begin to react at temperatures higher than 80 to 100° C. The result is interpenetrating organic-inorganic polymer networks that unite the good properties of both polymer types. The predomination of one property can be adjusted by the proper choice of the mixing compounds and must be determined from case to case through experiments in advance.

The production of the composition according to the present invention is carried out in a manner that, at least one organosilane of a general formula (A)

$$R^1_a R^2_b SiX_{(4-a-b)} \quad (A)$$

wherein $R^1$ represents a non-hydrolyzable radical, $R^2$ represents a non-hydrolyzable radical that includes a functional group and X represents similar or different radicals that are hydroxyl groups and hydrolyzable products of substitution reactions of hydroxyl groups, or oligomers therefrom, wherein a is 0 or 1, b is 0 to 3 and the sum of a and b can be 1, 2 or 3, where at least one radical $R^1$ is a non-hydrolyzable radical optional up to 50% based on the solid content of A, at least one silane of the general formula $SiX_4$, wherein the radical X is defined as in the case of general formula (A);

at least one silane wherein the radical has no epoxide ring;

at least one hydrolyzed alkoxide of an earth metal or a chemically related metal;

at least one aromatic or aliphatic diol;

at least one silane of the general formula $SiX_4$, wherein the radical X is defined as in the case of general formula (A) and/or further hydrolyzable chemical compounds, provided that the sum of all optional added compounds is not more than 50% based on the solid content of A, and can be hydrolyzed to a mixture of silanoles in a manner conventional in the art.

The present invention is particularly suitable for soles that can be achieved via the above described process.

The produced silanoles are in general, depending on the chemical nature of the used silanes and chosen additives, present as stable and at least partially oligomeric mixtures with low molecular weight. The expression "sol" in the so called sol-gel process for these mixtures shows that these chemical mixtures are not real chemical solutions but rather molecular dispersed molecules. The present invention should not be misunderstood to be limited on a certain state of aggregation.

According to the present invention the -hydrolyzed compounds are mixed just prior to their use with at least one blocked polyisocyanate and the so obtained mixture is polycondensed and thus cured. Generally curing is accomplished through the heating process.

Additionally, further compounds with several substituents that are able to condense can be used, particularly polyalcohols and polyphenoles.

Silicon Compound A

Organosilanes of general formula A according to the invention are silicon compounds equipped with two or preferably three hydrolyzable residues and one or two, preferably one non-hydrolyzable residue. In the view of macromolekular chemistry they are—optionally after hydrolysis—considered as polymerizable monomers. In the mixtures according to the invention at least one organosilane is employed which bears at least one non-hydrolyzable radical (substituent) exhibiting an epoxy radical as a functional group. Further organosilanes comprised by the said formula A and exhibiting no epoxy radical can be co-employed as indicated.

Examples for the hydrolyzable radicals are halogen (F, Cl, Br and I, particularly Cl and Br), alkoxy (particularly $C_{1-4}$ alkoxy such as, e.g., methoxy, ethoxy, n-propoxy, i-propoxy and butoxy), aryloxy (particularly $C_{6-10}$ aryloxy, e.g., phenoxy), acyloxy (particularly $C_{1-4}$ acyloxy such as e.g., acetoxy and propionyloxy), and alkylcarbonyl (e.g., acetyl). Particularly preferred non-hydrolyzable radicals are alkoxy groups, particularly methoxy and ethoxy.

Examples for non-hydrolyzable radicals without epoxide ring are alkyl, particularly $C_{1-4}$ (such as, e.g. methyl, ethyl, propyl, and butyl), alkenyl (particularly $C_{2-4}$ alkenyl such as, e.g., vinyl, 1-propenyl, 2-propenyl, and butenyl), alkynyl (particularly $C_{2-4}$ alkynyl such as, e.g., acetylenyl and propargyl), and aryl (particularly $C_{6-10}$ aryl such as, e.g., phenyl and naphthyl), the above mentioned groups optionally having one or more substituents such as, e.g., halogen and alkoxy. Methacryl and methacryloxypropyl radicals may also be mentioned in the present context.

Examples of silicon compounds A which may be employed according to the present invention may be found, e.g. on pages 8 and 9 of European Patent Application 195 493.

According to the present invention, organosilanes of the general formula A can be used, that exhibit epoxy groups attached via non-hydrolyzable residues and glycidyloxy-$C_{1-6}$-alkylene, where the radicals X are the same or different from each other (preferably the same), represent a hydrolyzable group and $R^2$ is a glycidyl- or glycidyloxy-$C_1$ to $C_{20}$-alkyl radical, particularly γ-glycidyloxyethyl-, γ-glycidyloxypropyl-, δ-glycidyloxybutyl-, ε-glycidyloxypentyl, ω-glycidyloxyhexyl- or 2-(3,4-epoxycyclohexyl)-ethyl-radical. Due to its ready availability, the use of γ-glycidyloxypropyl-trimethoxysilane (in the following abbreviated as GPTS) is particularly preferred according to the present invention.

According to the present invention, particularly preferred silicon compounds A are those of general formula $X_3SiR2$, wherein the radicals X, the same or different from each other (preferably the same), represent a non-hydrolyzable group and $R^2$ is a glycidyloxy-$(C_{1-6})$-alkylene radical.

Examples for different functional radicals $R^2$ are ether-, amino-, monoalkylamino-, dialkylamino-, amido-, carboxy-, mercapto-, thioether-, vinyl-, acryloxy-, methacryloxy-, cyano-, halogen-, aldehyd-, alkylcarbonyl-, sulfonic acid- or phosphoric acid-groups. These functional groups are directly linked to the silicon atom via alkylene-, alkenylene- or arylene-bridges, that can be interrupted by oxygen-, sulphur- or —HN-groups. The said bridging groups are derivatives from, e.g., the above mentioned alkyl-, alkenyl- or aryl radicals. The radicals $R^2$ have 1 to 18, particularly 1 to 8 carbon atoms.

An Interesting variation can be made through the incorporation of special, partly non-hydrolyzable radicals into the base silanes without epoxide rings. Appropriate compounds are, for example:

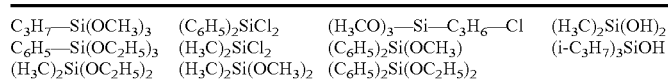

Silanes $SiX_4$

Additionally to the silane compound A compounds A2 which can be completely hydrolyzed can be used with the general formula, whose (similar or different) hydrolyzable radicals, are halogens (particularly preferred Cl and Br), alkoxy (particularly preferred $C_{1-4}$-alkyloxy, like acetoxy and propionyloxy) and alkylcarbonyl (e.g., acetyl), amino, monoalkylamino or dialkylamino which 1 to 12, particularly 1 to 6 carbon atoms. Particularly preferred hydrolyzable radicals are alkoxy groups, particularly methoxy and ethoxy.

The combined use of compounds with the general formula $SiX_4$ usually increases the water repellent (hydrophobic) character of the synthesized coatings.

Examples for compounds with the general formula $SiX_4$ without epoxide radicals which can be used are, i.a.:

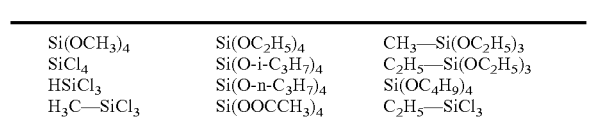

As apparent, said compounds A may also have non-hydrolyzable radicals having C=C double or triple bond. A particularly interesting group of non-hydrolyzable substituents are olefinically unsaturated substituents, such as substituents with vinyl-, allyl, and crotyl radicals.

Examples for these silanes are:

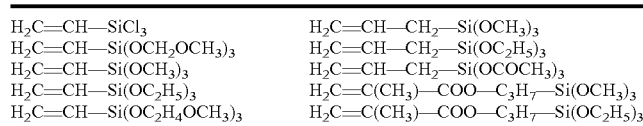

If such compounds are employed, additionally also (preferably epoxy or hydroxy group-containing) monomers such as e.g., (meth)acrylates may be incorporated into the composition (obviously said monomers may also have two or more functional groups of the same type such as, e.g., poly(meth) acrylates of organic polyols; the use of organic polyepoxides is also possible). In this case, in the thermally or photochemically induced curing of the corresponding composition, a polymerization of the organic species takes place in addition to the formation of an organically modified inorganic matrix whereby the cross-linking density and thus, also the hardness of the corresponding coatings and molded bodies is increased.

Beside the silicon compound A, also other hydrolyzable compounds of elements from the group of Si, Ti, Zr, Al, B, Sn, and V may be used to prepare the compositions according to the present invention and preferably hydrolyzed together with the silicon compound(s). The use of such elements together with silicon in hydrolyzis reactions often leads to an accelerated ring-opening of the epoxide groups of the used organosilanes and therefore has a strong influence on the durability of the ready to use compositions. The amount of such additional compounds should however, not exceed 70% by moles, and particularly 50% by moles of the total hydrolyzable compounds employed, it being particularly preferred if not more than 30%, and particularly not more than 10% by moles of the total of hydrolyzable compounds employed are different from the silicon compound(s) A.

Polyorganosilanoles should chemically behave as polyalcohols: Polyisocyanates should thus react with polyorganosilanoles to create urethane polymers. Also polyisocyanates react with epoxies. Mixtures of non-blocked isocyanates with condensable silanoles have, however, only a limited pot-life, because their components react at room temperature. Many potential applications requesting long-lived tools (like dip-coating) are, therefore, a priori prohibited In the case of other condensation reactions it was possible to dominate the reactivity of isocyanates by converting the isocyanates into NCO-terminated prepolymers which can react with water to give derivatives of urea. This technique, however, has the obvious disadvantage, that the live-time of the few free isocyanate groups is also limited.

According to the present invention, the mixtures can be time stored without any time limitations and therefore show the advantage that they do not have to be produced prior to work but they can be handled like conventional paints. This opens the opportunity for the development of versatile different coating systems which can be based on organic solvents, water or even powder coatings. A big advantage is the absence of free isocyanate which is very important for occupational safety. When blocked polyisocyanates are used in the invention the blocking agent will evaporate or remain in the produced coatings or molded bodies.

Blocked Isocyanates B

Blocked isocyanates (polyisocyanates) are reaction products from isocyanates with a blocking agent, which means a compound with at least one active hydrogen atom in its molecule. The blocked isocyanate products, their starting material, their production process and their chemical reactions are well known. Most of the isocyanate products are on the market and readily available and are used for various purposes, e.g., the production of polyurethanes.

The reaction of isocyanates with blocking agents HO—R' leads—at a temperature higher than approx. 100° C. reversibly—to special urethanes according to the following equilibrium reaction (1).

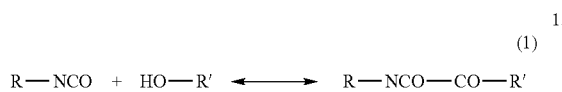
(1)

Many compounds are suitable for blocking agents; the reactive (acidic) hydrogen does not have to be part of a hydroxy group. Many of these compounds have only a single hydrogen atom. The active hydrogen must be accessible in the chemical reaction and steric hindrance must be avoided. Therefore, nitrogen containing compounds often are good blocking agents. In the form of —NH or —NOH they can be aromatic or aliphatic. The oxime as derivative of n-butanone is very often used (methyl-ethyl-ketoxime; MEKO). Further suitable blocking agents are: caprolactam (CAP), 3,5-dimethylpyrazole (DMPA), 3-methylpyrazole (3-MP), pyrazole (Py), 4-bromo-3methyl-pyrazole. Also diethylmalonate (DEM) can be used which has a reactive methylene group with two active hydrogen atoms from most cases only one reacts with the isocyanate. The blocked isocyanates are stable at room temperature. Trading products of blocked isocyanates are stable at room temperature, even when mixed with polyols. Only at temperatures (in general) higher than 100° C. the reaction runs from right to left according to equation (1) and the blocking agent is liberated. The reaction according to the present invention and process can lead to polyurethane structures and/or to polyurea-structures. The chemical behavior of the blocked polyisocyanates in the present invention can be compared to the chemical character of the unblocked polyisocyanates, the only difference is the temperature dependence. Also emulsions of blocked polyisocyanates can be used.

The blocking reaction with the before mentioned compounds that contain active hydrogen leads to: e.g., with butanone oxime to:

R—NH—CO—O—N=C(C$_2$H$_5$)$_2$     (I)

with malonic ester to:

R—NH—CO—CH(COO—C$_2$H$_5$)$_2$     (II)

with caprolactam to:

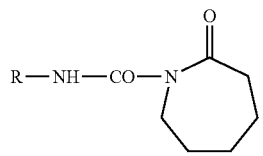
(III)

The polyisocyanates which can be used for the blocking reaction are e.g., 1,6-hexamethylen diisocyanate (HDI); isocyanurate of 1,6-hexamethylen diisocyanate (HDI-trimer); biuret of 1,6-hexamethylene diisocyanate (HDI-biuret); isophorone diisocyanate (IPDI); isocyanurate of isophorone diisocyanate (IPDI-trimer); tetramethylene xylene diisocyanate (TMXDI).

Furthermore, polymers from monomeric isocyanates can be used as blocked isocyanates. Especially dimeric and trimeric polyisocyanates have technical importance. Preferred are trimers that have the cyclic structure of isocyanuric acid amide, e.g. the following formula (IV):

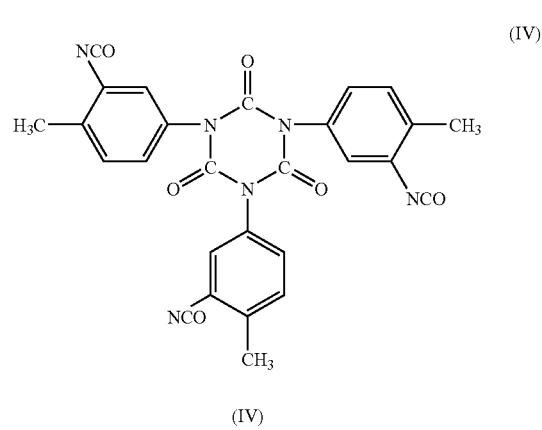

(IV)

A compound that is easily available is toluene diisocyanate blocked with malonic ester, like the following structure:

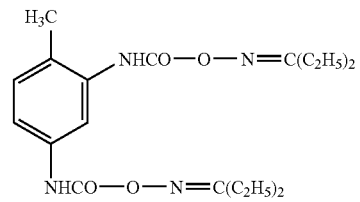

These polyisocyanates are reacted with the different blocking agents approx. in a stoichiometric relation of the functional groups to produce blocked polyisocyanates and lead to solid or liquid blocked polyisocyanates mostly with a few solvent in order to be present as liquids.

For the direct reaction of the reaction products of a hydrolyzed epoxysilane (e.g., GPRTS) with a blocked isocyanate the reacting groups should be in approx. the same stoichiometric amount, e.g., one mole of epoxy group containing silane should react with 0.5 mole of blocked dimeric isocyanate or 0.3 mole of blocked trimeric isocyanate. Due to the possibility of the isocyanate group to react with water and with each other, it can be an advantage to have a surplus of these groups in the mixture. As apparent in the present invention and its mixtures the relation of epoxy group of silicon compounds, of blocked polyisocyanates and of further possible compounds that are able to condense should be that the amount of surplus OH-groups in the cured reaction product should be as small as possible. Surplus polyisocyanate can lead to polyurea through the loss of carbon dioxide. Thus, crosslinking is assured in any case. With starting materials of a composition which is not sufficiently known, it is advisable to carry out a preliminary experimenting order to assure that an approximately complete conversion is achieved.

Examples for actually commercially available blocked isocyanates are, e.g.: Desmodur® BL types (Bayer AG), e.g., Desmodur® BL 1100, Desmodur® BL 1265 MPA/X; Vestanat® types (Degussa-Hüls, Creanova® base products for varnishes), e.g.; Vestanat® B 1370; Additol® types (Vianova Resins SpA), e.g., Additol® XL 465; Trixene® BI types (Baxenden Chemicals Ltd.). Also emulsions of blocked polyisocyanates as Halwedrol® EB 20140 (Hüttenes Albertus-Lackrohstoff GmbH) are suitable. The mentioning of protection by registered trademark (®) in the context with the respective names is without any warranty and is, if applicable, also valid for the respective products in the following examples.

Examples for the chemical basis of some commercial products:

| Product | Basis | Blocking agent |
|---|---|---|
| Desmodur BL 3370 MPA | HDI | diisopropyl amine/ethanol |
| Demsodur BL 3475 BA/SN | HDI | ethanol |
| Desmodur BL 4265 SN | IPDI | butanone oxime |
| Crelan UI | IPDI | caprolactam |
| Trixene BI 7982 | HDI | DMP |
| Trixene BI 7986 | HDI | DMP |

In general, the blocked polyisocyanates are added to the hydrolyzed epoxysilanes (e.g., glycidyloxypropyl trimethoxy silane; 2-(3,4-epoxy-cyclohexyl)-ehtyltrimethoxysilane) in the said amounts or molar ratios. Clear, according dilution slightly viscous, liquids are formed that can immediately be used as coating material. They can also be used as a binder and can be mixed, for example with fillers such as pigments, can be dyed or otherwise modified. For example they may contain additives for improving flow and rheology and they may be applied as single component material with conventional application techniques e.g., on metals. Curing is usually accomplished by heating (baking, stoving) at temperatures above 100° C., e.g., 120 to 180° C. for time from e.g., 10 minutes up to 2 hours. The optimum curing conditions should be determined through a preliminary experiment and may be different depending on the raw materials. The compositions adhere very well on the substrates and can be used directly on the metal surface, e.g. without chromating on aluminum surfaces. They are hard, have good wear resistance and excellent corrosion protective properties. E.g., in saltspray testing there was no damaging or corrosion after 2,000 h. These layers may be applied in very low thickness (e.g. from 5 microns upwards for clear coats and from 15 microns upwards for pigmented coatings, with appropriately fine pigments) which are resistant against most organic solvents.

As a special modification e.g., aromatic polyols can be used. Such Polyols are often used as commercial products in large quantities and have an average molecular weight of not more than 1,000. Examples of such aromatic polyols are, e.g., polyphenylene ethers having hydroxyl groups bonded to at least two phenyl rings, as well as in general compounds (oligomers) wherein the aromatic rings are connected to each other by a single bond, —O—, —CO—, —SO$_2$—, etc., and have at least (and preferably) two hydroxy groups bonded to aromatic groups. Particularly preferred aromatic polyols are aromatic diols like bisphenole-A (4,4'-isopropylidene diphenole).

The compositions according to the present invention are particularly suitable as coating composition with different purposes, like the already known compositions. Particularly interesting applications are, e.g., so called easy-to-clean coatings for metal surfaces in the wet-room areas of housings and public installations such as aluminium frames of shower cabins, windows and picture glazing. An interesting application can be to avoid oxidation of silver, metal fittings or decorative elements from non-ferrous metal. Precision screws and other mass articles can be coated by drum polishing.

Processing

Storage time of compositions according to the present invention at room temperature is at least six month up to one year. In order to adjust the rheological properties of the compositions (e.g. for spraying) dilution with water or an inert solvent (for example ethylacetate, butylacetate), depending on the particular mixture may be performed. The application onto the substrate may be effected by standard coating methods such as, e.g., dip-coating, brushing, roller coating, spray coating, and spin-coating. Particularly spay coating and dip-coating are perfectly suitable. After application the composition is heat cured for 60 minutes at 120° C. and the liquid composition reacts to form a three-dimensional network. The cured coating will attain full resistance after a three days after curing at room temperature.

EXAMPLE 1

1-component Sol-gel Basic System

To 543.0 g of γ-(glycidyloxypropyl)trimethoxysilane (GPTS) there is added 49.0 g 0.1 M hydrochloric acid at room temperature and under stirring. In an slightly exothermic reaction the composition heats up within several minutes which after a few seconds turns into a single phase. After 10 minutes, 137.0 g of blocked polyisocyanate (Desmodur BL 3370, Bayer) were added to the mixture and whereafter stirring is continued for 10 minutes. To adjust viscosity 270 g of ethyl acetate is added. The mixture is water clear and slightly viscous and may be further diluted according to the particular application technique by adding more solvent (for example ethyl acetate, butyl acetate). The curing is affected by thermal treatment at 150° C. for 60 minutes.

EXAMPLE 2

1-component, Water-based Sol-gel Basic System

To 543.0 g of γ-(glycidyloxypropyl)trimethoxysilane (GPTS) there is added 49.0 g 0.1 M hydrochloric acid under stirring. In an exothermic reaction the composition heats up within several minutes and turns into a single phase. After 10 minutes, 250.0 g of water-based blocked polyisocyanate (Trixene BI 7986; Baxenden) were added to the mixture and dissolved under stirring. To adjust viscosity 100 g of water is added. The mixture is clear and slightly viscous.

EXAMPLE 3

GPTS/bisphenole-A/blocked Polyisocyanate

To 535.0 g of γ-(glycidyloxypropyl)trimethoxysilane (GPTS) there is added 52.5 g 0.1 M hydrochloric acid at room temperature and under stirring. The composition heats up within several and turns into a single phase. After 10 minutes, 203.5 g bisphenole-A is added. Furthermore 32.0 g of commercial product Desmodur BL 1265 MPX, Manufacturer Bayer AG were added, which is a blocked polyisocyanate on the basis of toluylene diisocyanate. The curing I is affected at 160° C. for 60 minutes.

EXAMPLE 4

Pigmented Mixture According to the Present Invention

As described in European patent pending EP 1 179 575 describing the pigmentation of different sol-gel systems, the coatings according to the present invention can be pigmented. For obtaining a coating with metallic-effect, there is added 1.8 g 0.1 M hydrochloric acid at room temperature and under stirring to 25.8 g of γ-(glycidyloxypropyl)trimethoxysilane (GPTS). Within several minutes the composition heats up and turns into a single phase. After 10 minutes, 14.2 g of a commercial blocked polyisocyanate, Desmodur BL 3370 MPA were added and dissolved under further stirring. To this mixture 5,5 g of a commercial metal effect pigment is added (for example Stapa Metallux 200 of the manufacturer Eckart-Werke Fürth) and stirred with a dissolver for 10 minutes at low rotational speed. To adjust viscosity 40 g of ethyl acetate is added. The mixture is slightly turbid and has a low viscosity.

Repaintable Formulations

The above described coating materials have hydrophobic character and have only a low surface energy. These coatings usually can not be repainted with conventional liquid paints or powder coatings. Therefore they can be used as anti-graffiti coatings.

Into the coating materials in the present invention, pyrogenic silicic acids can be dispersed which lead to coatings which have micro-roughness on its surface and a significantly increased surface energy and hydrophilicity. Pyrogenic silicic acids are highly dispersed silicon dioxide particles, that are white powders with a primary particle size in toe range of 7 to 50 nm. The untreated particles have hydrophilic character due to their silanole groups on their surface. Such products can be bought as, e.g., Aerosil (Degussa AG). The amount of the added pyrogenic silicic acid can be up to 30% per weight referred to the total composition. Often, an addition of 0.5% per weight is sufficient.

Using the said silicic acid modified coating material in the present invention lead to coatings which can be used as primer coatings with a very low coating thickness—predominantly for light metals as Aluminum and Magnesium—and can be repainted with liquid coating materials and with powder coatings. Also, various glues stick well on the surface. This leads to adhesion promoters that have an excellent corrosion protection at the same time. The usual preparation of the light metal surfaces for the painting by chromating may be dispensed with.

EXAMPLE 5

Repaintable Formulation, Dispersing of a Hydrophilic Filler

To 22.4 g of γ-(glycidyloxypropyl)trimethoxysilane (GPTS) there is added 1.5 g 0.1 M hydrochloric acid under stirring. The composition heats up within several minutes and turns into a single phase. After 10 minutes, 14.1 g of Desmodur BL 3370 MPA were added and dispersed for under further stirring. 5.0 g Aerosil 900 are added and dispersed with a dissolver or a bead mill for 15 minutes at high rotational speed. For 10 minutes. To adjust viscosity 55.0 g of solvent (e.g. ethyl acetate) is added. The mixture is slightly turbid and of low viscosity.

Processing:

For adjusting of the processing viscosity (for example for spraying applications) one may dilute by adding more solvent (for example ethyl acetate, butyl acetate). The application may be performed with the usual techniques such as spraying, centrifuging, dipping, flooding etc.

What is claimed is:

1. A curable composition based on hydrolysis products from organosilanes, comprising
   A. at least one product of the hydrolyzation of an organosilane of formula (A)

   $R^1_a R^2_b SiX_{(4-a-b)}$ (A)

wherein $R^1$ represents a non-hydrolyzable radical, $R^2$ represents a non-hydrolyzable radical that includes a functional group and X represents the same or different radicals that are hydroxyl-groups or hydrolyzable groups, or oligomers therefrom, wherein
   a is 0 or 1,
   b is 1 to 3 and
   the sum of a and b can be 1, 2 or 3,
   and at least one substituent $R^2$ has an epoxy group;
   B. at least one blocked polyisocyanate,
   wherein the curable composition is characterized in that it contains a product of a hydrolyzation reaction, that was obtained through common hydrolysis of at least one organosilane of the formula A; and
   C. optionally not more than 50% based on the solid content of A by weight of a component selected from the group consisting of: at least one silane of formula $SiX_4$, wherein the radical X is defined as in the case of formula (A); at least one silane wherein the compound has no epoxide ring; at least one aromatic or aliphatic diol; hydrolyzable chemical compounds, and combinations thereof, wherein at least one substituent $R^2$ has a functional group selected from the group consisting of: ether-, amino-, monoalkylamino-, dialkylamino-, amido-, mercapto-, thioether-, vinyl-, acryloxy-, methacryloxy-, cyano-, halogen-, aldehyde-, alkylcarbonyl-, sulfonic acid- and phosphoric acid-group, wherein said functional groups are directly linked to the silicon atom via an alkylene-, alkenylene- or arylene- bridge, that can be interrupted by an oxygen-, sulphur- or —HN-group, and wherein the radicals $R^2$ have 1 to 18 carbon atoms.

2. Composition according to claim 1, characterized in that $R^2$ is a glycidyloxy-$C_{1-6}$-alkyl.

3. A curable composition based on hydrolysis products from organosilanes, comprising
   A. at least one product of the hydrolyzation of an organosilane of formula (A)

   $R^1_a R^2_b SiX_{(4-a-b)}$ (A)

wherein $R^1$ represents a non-hydrolyzable radical, $R^2$ represents a non-hydrolyzable radical that includes a functional group and X represents the same or different radicals that are hydroxyl-groups or hydrolyzable groups, or oligomers therefrom, wherein
   a is 0 or 1,
   b is 1 to 3 and
   the sum of a and b can be 1, 2 or 3,
   and at least one substituent $R^2$ has an epoxy group;
   B. at least one blocked polyisocyanate,
   wherein the curable composition is characterized in that it contains a product of a hydrolyzation reaction, that was obtained through common hydrolysis of at least one organosilane of the formula A; and C. optionally not more than 50% based on the solid content of A by weight of a component selected from the group consisting of: at least one silane of formula $SiX_4$, wherein the radical X is defined as in the case of formula (A); at least one silane wherein the compound has no epoxide ring; at least one aromatic or aliphatic diol; hydrolyzable chemical compounds, and combinations thereof, wherein the reactive hydroxyl groups have a stoichiometric relation relative to the isocyanate of about 1.

4. Composition according to claim 3, characterized in that X is halogen, alkoxy, aryloxy, acyloxy, or alkylcarbonyl.

5. Composition according to claim 3, characterized in that it has additionally at least one pigment and/or filler, predominantly a hydrophilic filler.

6. A composition according to claim 3, wherein at least one $R^2$ has a functional group selected from the group consisting of: ether-, amino-, monoalkylamino-, dialkylamino-, amido-, mercapto-, thioether-, vinyl-, acryloxy-, methacryloxy-, cyano-, halogen-, aldehyde-, alkylcarbonyl-, sulfonic acid- and phosphoric acid-groups, wherein the functional groups are directly linked to the silicon atom via alkylene-, alkenylene- or arylene- bridges, that can be interrupted by oxygen-, sulphur- or —NH-groups, and wherein the said bridging groups are derivatives from, e.g., the above mentioned alkyl-, alkenyl- or aryl radicals, and wherein the radicals $R^2$ have 1 to 8 carbon atoms.

7. A composition according to claim 3, wherein the hydrolyzable compounds are compounds of elements from the group consisting of Si, Ti, Zr, Al, B, Sn, and V.

8. Composition according to claim 3, characterized in that $R^1$ is an alkyl, alkenyl, alkynyl or aryl, whereby these radicals $R^1$ can have one or more substituents.

9. Composition according to claim 8, characterized in that $R^1$ is a $C_{1-4}$-alkyl, $C_{2-4}$-alkenyl, $C_{2-4}$-alkynyl or $C_{6-10}$-aryl, whereby these radicals $R^1$ can have one or more substituents.

10. A process comprising hydrolyzing a silane, having at least one non-hydrolyzable substituent bearing an epoxy group, mixing the hydrolyzation products with at least one blocked polyisocyanate and curing the mixture under removal of water, wherein any reactive hydroxyl groups in the silane have a stoichiometric relation relative to the isocyanate of about 1.

11. A process according to claim 10, characterized in that at least one silicon compound of the formula A $$R^1_a R^2_b SiX_{(4-a-b)} \quad (A)$$

is used, where the radicals $R^1$ (equal or different) is a hydrolyzable radical chosen from $C_{1-4}$-alkoxy and $R^2$ is a glycidyloxy-$(C_{1-6})$-alkylene radical and X represents similar or different radicals that are hydroxyl groups and hydrolyzable products of substitution reactions of hydroxyl groups, or oligomers therefrom, wherein a is 0 or 1, and b is 1 to 3.

12. A process according to claim 10, characterized in that γ-glycidyloxy-propyltrimethoxysilane is used as silicon compound.

13. A curable composition based on hydrolysis products from organosilanes, comprising
A. at least one product of the hydrolyzation of an organosilane of formula (A)

$$R^1_a R^2_b SiX_{(4-a-b)} \quad (A)$$

wherein $R^1$ represents a non-hydrolyzable radical, $R^2$ represents a non-hydrolyzable radical that includes a functional group and X represents the same or different radicals that are hydroxyl-groups or hydrolyzable groups, or oligomers therefrom, wherein
a is 0 or 1,
b is 1 to 3 and
the sum of a and b can be 1, 2 or 3,
and at least one substituent $R^2$ has an epoxy group;
B. at least one blocked polyisocyanate,
wherein the reactive hydroxyl groups have a stoichiometric relation relative to the isocyanate of about 1.

14. The curable composition according to claim 13, wherein X is selected from the group consisting of halogen, alkoxy, aryloxy, acyloxy, and alkylcarbonyl.

15. The curable composition according to claim 13, wherein X is selected from the group consisting of F, Cl, Br, methoxy, ethoxy, n-propoxy, i-propoxy, butoxy, phenoxy, acetoxy, propionyloxy, and acetyl.

* * * * *